Figure 3:
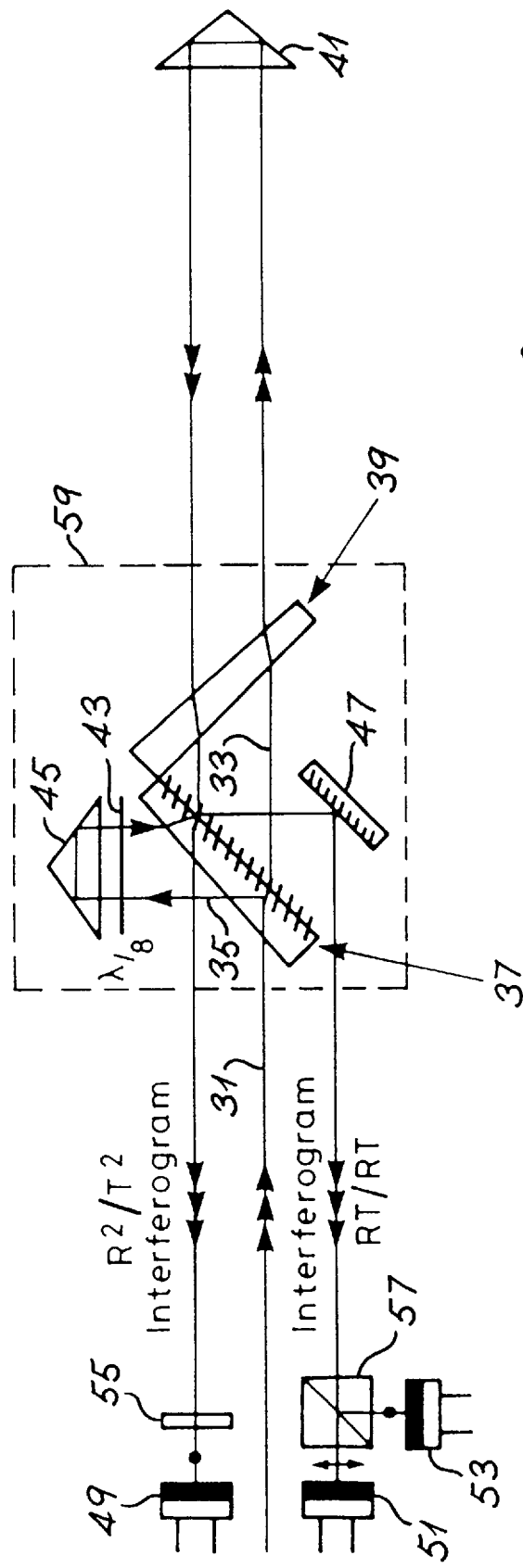

United States Patent [19]
Downs

[11] Patent Number: 5,847,828
[45] Date of Patent: Dec. 8, 1998

[54] MICHELSON INTERFEROMETER USING MATCHED WEDGE-SHAPED BEAM SPLITTER AND COMPENSATOR

[75] Inventor: Michael John Downs, Liphook, England

[73] Assignee: BTG International Limited, London, England

[21] Appl. No.: 392,417

[22] Filed: Feb. 22, 1995

Related U.S. Application Data

[63] Continuation of Ser. No. 838,199, Mar. 5, 1992, abandoned.

[30] Foreign Application Priority Data

Sep. 8, 1989 [GB] United Kingdom .................. 8920364

[51] Int. Cl.⁶ ....................................................... G01B 9/02
[52] U.S. Cl. ............................................................. 356/346
[58] Field of Search ............................ 356/345; 350/346; 250/339.08, 339.09

[56] References Cited

U.S. PATENT DOCUMENTS

| | | | |
|---|---|---|---|
| 2,081,936 | 6/1937 | Keenan | 356/401 |
| 2,571,937 | 10/1951 | Peck | 356/346 |
| 4,265,540 | 5/1981 | Doyle . | |
| 4,278,351 | 7/1981 | Frosch . | |
| 4,286,877 | 9/1981 | Clarke . | |
| 4,391,525 | 7/1983 | Woodruff | 356/346 |

FOREIGN PATENT DOCUMENTS

| | | |
|---|---|---|
| 1772171 | 3/1972 | Germany . |
| 717233 | 10/1954 | United Kingdom . |
| 800304 | 8/1958 | United Kingdom . |
| 2117918 | 10/1983 | United Kingdom . |

OTHER PUBLICATIONS

"High–Resolution Spectrometer/Interferometer", Breckingridge et al, NASA Tech Briefs, 1980, p. 162.

W.H. Steel, "Adjustable Cmpensators for Two–Beam Interferometers", OPTICA ACTA, vol. 9, No. 2, Apr. 1962, pp. 111–119.

J.B. Breckinridge, "A Chevron Beam–Splitter Interferometer", NASA Tech.Briefs, vol. 4, No. 1, 1979, pp. 51–52.

*Primary Examiner*—Samuel A. Turner
*Attorney, Agent, or Firm*—Pillsbury Madison & Sutro LLP

[57] ABSTRACT

A Michelson interferometer has a wedge-shaped beamsplitter (7) and compensator (9) plates of substantially identical wedge angle and thickness. The compensator plate is positioned to cancel out beam displacement and deviation introduced by the beamsplitter plate.

10 Claims, 2 Drawing Sheets

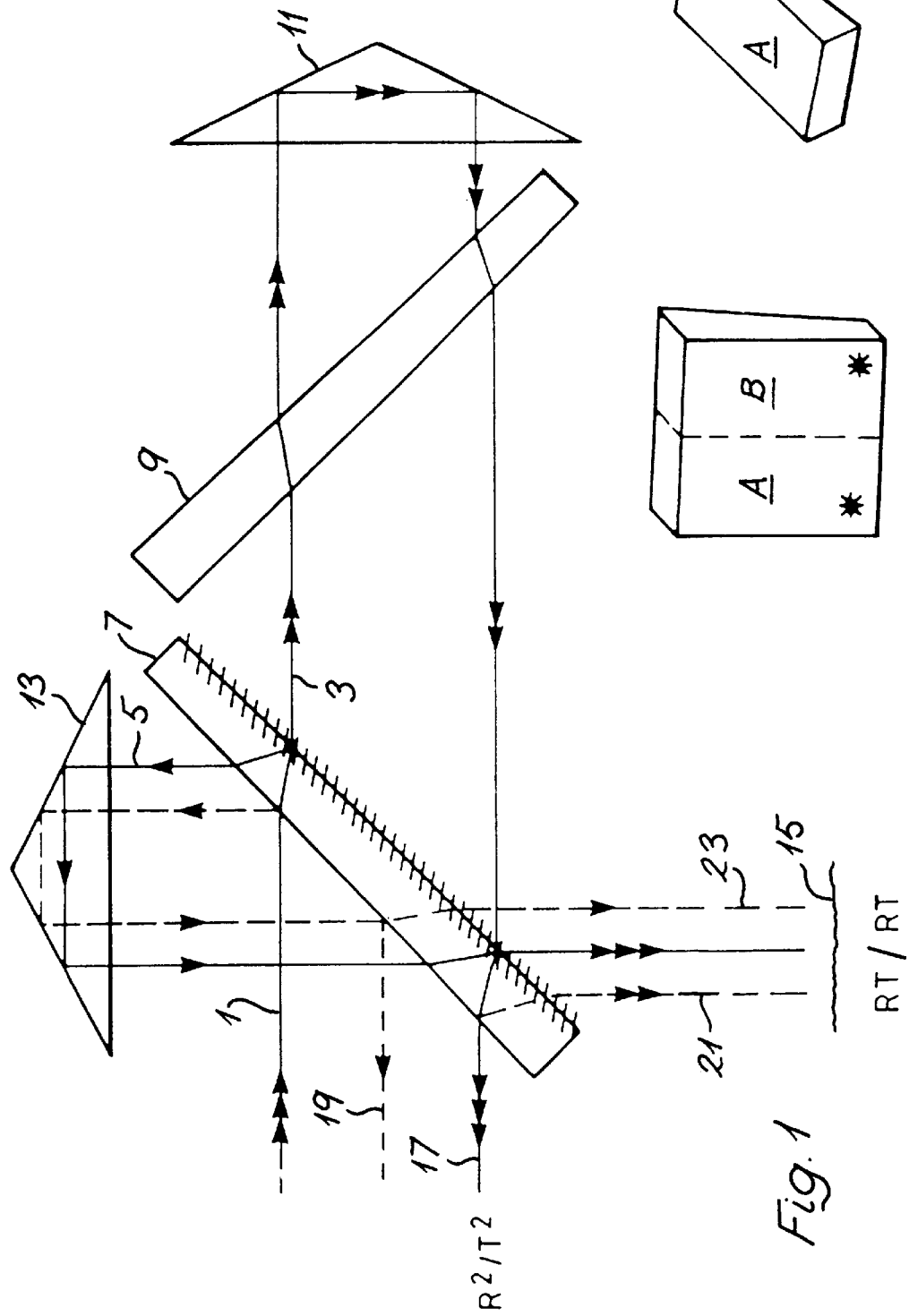

MICHELSON INTERFEROMETER USING MATCHED WEDGE-SHAPED BEAM SPLITTER AND COMPENSATOR

This is a continuation of application Ser. No. 07/838,199, filed on Mar. 5, 1992, which was abandoned upon the filing hereof.

This invention relates to optical measuring instruments and, in particular, to laser interferometers.

Optical interferometry is widely used for the measurement of length and the coherence of laser radiation permits fringe-counting systems with measurement ranges in the free atmosphere of up to 50 meters. The most commonly used radiation sources are frequency stabilised helium-neon lasers. These devices are readily available commercially and experience has shown that their frequencies do not usually change by more than a few parts in $10^8$ over the lifetime of the laser tube. Interferometers measure length in terms of the wavelength of the radiation and, when they are used in the free atmosphere, it is essential to apply a correction for the refractive index of the air. The two techniques currently used for performing this correction are the calculation of a refractive index value using Edlen's equation by measuring the atmospheric pressure, temperature and humidity, and the direct measurement using an interference refractometer. The results of comparisons between calculated and measured values have shown that where an uncertainty of the order of ±1 part in $10^7$ is acceptable in the refractive index of the air, a calculated value may be employed. This source of uncertainty is reduced to approaching a part in $10^8$ when a refractometer is used.

By using electronic systems to analyse the electrical signals generated from the optical path length changes, sub-nanometric solutions can be achieved by interferometer systems, provided that disturbances due to temperature, vibration and air turbulence etc. are minimised. However, there are two basic systematic limitations to the accuracy achievable when realising this high resolution.

Many interferometric systems employ polarisation techniques to derive the electrical signals required for reversible fringe counting from their optical outlets. The signals should be sinusoidally related to path difference and, ideally, they should be in phase quadrature, equal in amplitude and their mean DC levels zero. In practice the signals are not ideal and, when resolving to sub-nanometric precision, the imperfections impose a limit on the accuracy achievable by the interferometer system. Thin film polarising beamsplitter designs providing sufficient isolation between the two orthogonally polarised beams are not available and it is sometimes difficult to maintain the required alignment of the polarisation azimuth of the optical components. However it is possible to correct systems for non-ideal optical signals electronically. This is achieved by scanning the optical path in the interferometer through at least one fringe and examining the phases, amplitudes and DC levels of the signals both to compute any necessary changes and also to confirm the sinusoidal quality of the interferometer signals.

Stray reflections are another severe systematic limitation to achieving both accuracy and resolution in interferometers. With a laser source the unwanted beams are coherent, so that even one tenth of a percent of the beam energy can cause an anomalous variation in the interferometer signal and a non-linearity error of 1.6 nm in the optical path length measured.

In British Patent No. 2012450B there is described an interferometer (hereinafter referred to as the NPL interferometer) which utilises a plate beamsplitter. It is standard practice with this type of interferometer to minimise the effects of reflections from the non-beamsplitting surface by both employing a standard anti-reflection coating on the surface and by slightly wedging the beamsplitter plate. The latter practice is the most efficient way of solving the problem. From the equations of Rowley (W R C Rowley "Signal strength in two-beam interferometers with laser illumination" Optica Acta 16 (1969) 159–168) it may be shown that the beam divergence caused by a wedge of 1 ½ minutes of arc introduces sufficient fringes across the aperture of a 1 mm diameter Gaussian distribution beam for any stray reflections falling on the photodetectors to have less than nanometric influence on the phase of the interferogram.

Although wedging removes the problems due to stray reflections it presents another problem in that it effectively turns the beamsplitter into a weak prism. The resulting beam divergence, together with the displacement caused by the 45° angle of incidence on to the plate impose the condition that the beamsplitter must be in position when the optical beam is aligned to the mechanical axis of movement. In practice this makes the alignment procedure extremely difficult and, in addition, prevents the interchange of beamsplitters other than those fabricated with a specified thickness and wedge angle. In order to realise accurate sub-nanometric resolution in interferometers having a beamsplitter plate, a beamsplitter and compensator plate system has been devised.

According to the present invention there is provided a Michelson interferometer having wedge-shaped beamsplitter and compensator plates of substantially identical wedge angle and thickness wherein the compensator plate is positioned to cancel out beam displacement and deviation introduced by the beamsplitter plate.

This enables the optimum alignment of the optical and mechanical axes of the system to be achieved before the interferometer block is introduced into the system as it leaves the alignment totally unaffected.

An embodiment of the invention will be particularly described with reference to the accompanying drawings, in which:

FIG. 1 shows, in schematic form, a Michelson interferometer in accordance with one embodiment of the invention;

FIGS. 2a and b show beamsplitter and compensator plates for the interferometer of FIG. 1; and FIG. 3 shows a length measuring interferometer in accordance with another specific embodiment of the invention.

Referring now to the drawings, FIG. 1 shows a Michelson interferometer with a compensator plate. Radiation from a laser source enters the interferometer as a laser beam 1. It is separated into a transmitted beam 3 and a reflected beam 5 by a wedge-shaped beamsplitter 7. The transmitted beam 3 passes by way of a wedge-shaped compensator plate 9 to a retroreflector 11 and back through the compensator plate to the beamsplitter. The reflected beam 5 is further reflected by a retroreflector 13 and passes again to the beamsplitter 7 where it is combined with the returning transmitted beam 3 to form two interferograms 15, 17. The plate 39 acts as a compensator, cancelling out the beam displacement and deviation introduced by the beamsplitter plate 37.

A beamsplitter plate of twice the required size is fabricated. This is then cut into two equal parts A, B (FIG. 2a), which are used in the optical configuration shown in FIG. 2b. It will be appreciated that it is important to introduce some means of orientation identification on to the plate, for example by slightly chamfering two corners at one end, before it is cut. (Indicated by a star on the drawing.)

This arrangement is completely insensitive to the thickness and wedge angle of the orthogonal plate. If the direction of the wedge in the beamsplitter plate is confined to the direction in which the beams are displaced, the interferometer system is also chromatically corrected when the outgoing and reflected light beams are symmetrically disposed about the center of the beamsplitter plates. This would be an advantage if a multi-wavelength source were to be employed. The main stray reflections from the non-beamsplitting interface labelled 19, 21 and 23, are shown in FIG. 1 by the dashed ray path. Beams 21 and 23 are deviated, but it is important to note that the beamsplitter wedge does not introduce any angular deviation between reflection 19 and the main interferogram 17. Although this is a potential source of error the beam undergoes two relatively low intensity reflections, of the order of 1% and it is significantly displaced so that it will not fall on the photodetector, provided that a beamsplitter plate several millimeters thick is employed.

In accordance with a further aspect of the invention, a length-measuring interferometer may be modified by the addition of a reflector, as shown in FIG. 3, to allow both interferograms to be examined remotely from the interferometer block.

In this apparatus, an incident laser beam 31 is separated into a transmitted beam 33 and a reflected beam 35 by a wedge-shaped beamsplitter 37. The transmitted beam passes via a wedge-shaped compensator plate 39 to a movable retroreflector 41. The reflected beam 35 passes by way of a λ/8 phase plate 43 to a retroreflector 45 and thence back to the beamsplitter. A reflector 47 permits both the transmittance and the reflectance interferograms to be examined in the same remote location by photodetectors 49, 51, 53, polariser 55 and polarising beamsplitter 57.

This arrangement permits the critical components to be mounted on an interferometer block 59.

By electronically analysing the sinusoidally varying path length signals provided by interferometers, sub-nanometric accuracy and resolution can be achieved. However, stray reflections can cause significant systematic errors when resolving to this accuracy and it is essential to design the optics to tilt the wavefront of any stray reflections that reach the photodetectors.

I claim:

1. A displacement-measuring Michelson interferometer having orthogonally arranged measuring and reference arms terminated respectively by a movable retroreflector member and a fixed retroreflector member, the arms defining first and second orthogonal optical axes of the interferometer, the first of said optical axes including an input radiation beam and a transmitted radiation beam, the second of said optical axes including a reflected radiation beam disposed orthogonally to said incoming radiation beam and said transmitted radiation beam, the interferometer comprising:

first and second substantially identical optical wedges disposed along said first optical axis of said axes and having corresponding substantially identical surfaces, said substantially identical wedges being positioned along and oriented with respect to said first optical axis such that
   a) said wedges are generally inclined at equal and opposite directions with respect to said first optical axis,
   b) said wedges are inclined with respect to one another of that a relatively thinner end of the first wedge is disposed closer to a relatively thicker end of the second wedge than a relatively thinner end of the second wedge
   c) a predetermined one of said corresponding identical surfaces of each of the wedges are disposed so as to be an initial surface of the respective wedges upon which radiation travelling along said first optical axis impinges, a reflective material disposed on a surface of said first optical wedge opposite the predetermined surface of said first optical wedge so that said first optical wedge and said reflective material form an interferometer beam splitter; and photosensitive means spaced from the predetermined surface of the first optical wedge for receiving a first interferogram.

2. An interferometer according to claim 1 further comprising an eighth wave plate adjacent one of said retroreflector members, and a plane reflector arranged to receive a second interferogram and direct it in a direction parallel to the first interferogram.

3. An interferometer according to claim 2 in which the first and second optical wedges, the fixed retroreflector member, the eighth wave plate, and the plane reflector are all supported by a single interferometer block.

4. An interferometer according to claim 3 further comprising a polarizing beam splitter arranged to receive radiation reflected from the plane reflector, and a pair of photodetectors arranged to receive respectively transmittance and reflectance interferogram signals from the polarizing beam splitter.

5. An interferometer according to claim 4 in which the first interferogram is the $R^2 2/T$ interferogram and the second interferogram is the RT/RT interferogram.

6. A displacement-measuring Michelson interferometer having orthogonally arranged measuring and reference arms terminated respectively by movable and fixed retroreflector means, the arms defining first and second orthogonal optical axes of the interferometer, the first of said optical axes including an incoming radiation beam and a transmitted radiation beam, the second of said optical axes including a reflected radiation beam disposed orthogonally to said incoming radiation beam and said transmitted radiation beam, the interferometer comprising:

first and second substantially identical optical wedges disposed along said first optical axis of said axes and having corresponding substantially identical surfaces, said substantially identical wedges being oriented along said first optical axis such that:
   a) said wedges are disposed along the axial direction of said first optical axis,
   b) said wedges are generally inclined at equal and opposite directions with respect to an optical axis of said same arm,
   c) said wedges are inclined with respect to one another so that a relatively thinner end of the first wedge is disposed closer to a relatively thicker end of the second wedge than a relatively thinner end of the second wedge,
   d) a predetermined one of said corresponding identical surfaces of each of the wedges are disposed so as to be an initial surface of the respective wedges upon which radiation travelling along said first optical axis impinges, a reflective material disposed on a surface of said first optical wedge opposite the predetermined surface of said first optical wedge so that said first optical wedge and said reflective material form an interferometer beam splitter, said reflective material being adapted to reflect said input radiation beam along the second optical axis orthogonal to said first optical axis along which said optical wedges are disposed; and photosensitive means spaced from the front surface of the first optical wedge for receiving an $R^2/T^2$ interferogram.

7. A displacement-measuring Michelson interferometer having orthogonally arranged measuring and reference arms terminated respectively by fixed and movable retroreflector means, the arms defining first and second orthogonal optical axes of the interferometer, the first of said optical axes including an input radiation beam and a transmitted radiation beam, the second of said optical axes including a reflected radiation beam disposed orthogonally to said incoming radiation beam and said transmitted radiation beam, the interferometer comprising first and second substantially identical optical wedges disposed along said first optical axis of said axes and having corresponding substantially identical surfaces, said substantially identical wedges being oriented along said first optical axis such that:
  a) said wedges are generally inclined at equal and opposite directions with respect to said first optical axis,
  b) said wedges are inclined with respect to one another so that a relatively thinner end of the first wedge is disposed closer to a relatively thicker end of the second wedge than a relatively thinner end of the second wedge,
  c) a predetermined one of said corresponding identical surfaces of each of the wedges are disposed so as to be an initial surface of the respective wedges upon which radiation travelling along said first optical axis impinges, a reflective material disposed on a surface of said first optical wedge opposite the predetermined surface of said first optical wedge so that said first optical wedge and said reflective material form an interferometer beam splitter, said reflective material being adapted to reflect said input radiation beam along the second optical axis orthogonal to said first axis along which said optical wedges are disposed;

first photosensitive means spaced from the predetermined surface of the first optical wedge for the receiving an $R^2/T^2$ interferogram;

an eighth wave plate arranged along said second optical axis;

a plane reflector arranged to receive an RT/RT interferogram and direct it in a direction parallel to the $R^2/T^2$ interferogram;

a single interferometer block supporting each of the first and second optical wedge, the fixed retroreflector, the eighth wave plate and the plane reflector;

a polarizing beam splitter constructed and arranged to receive the RT/RT interferogram; and second and third photosensitive means arranged to receive transmittance and reflectance interferogram signals respectively from the polarizing beam splitter.

8. A method of manufacturing a Michelson interferometer comprising the steps of:

providing first and second retroreflector members;

providing an optical wedge plate having a relatively thicker end and a relatively thinner end;

dividing the optical wedge plate into first and second separate optical wedges of substantially the same dimensions and so that said first and second wedges have corresponding substantially identical surfaces, said first and second wedges each having a relatively thicker end and a relatively thinner end; and orienting said first and second retroreflector members and said first and second wedges to form a desired optical measuring path and a desired optical reference path for the interferometer, said optical paths defining first and second orthogonal optical axes of the interferometer, the first of said optical axes including an input radiation beam and a transmitted radiation beam, the second of said optical axes including a reflected radiation beam disposed orthogonally to said incoming radiation beam and said transmitted radiation beam, and further orienting said first and second wedges such that:
  a) said wedge are generally inclined at equal and opposite directions with respect to said first optical axis of said axes,
  b) said wedges are inclined with respect to one another so that a relatively thinner end of the first wedge is disposed closer to a relatively thicker end of the second wedge than a relatively thinner end of the second wedge, and
  c) a predetermined one of said corresponding substantially identical surfaces of each of the wedges are disposed so as to be an initial surface of the respective wedges upon which radiation travelling along said first optical axis impinges.

9. A method of manufacturing a Michelson interferometer, said interferometer having first and second orthogonal optical axes, the first of said optical axes including an input radiation beam and a transmitted radiation beam, the second of said optical axes including a reflected radiation beam disposed orthogonally to said incoming radiation beam and said transmitted radiation beam, said method comprising the steps of:

providing first and second retroreflector members, providing an optical wedge plate having a relatively thicker end and a relatively thinner end;

dividing the optical wedge plate perpendicularly to a plane of the plate so as to form first and second separate wedges of substantially the same dimensions;

orienting said wedges such that one wedge is rotated with respect to the other by 180° about an axis perpendicular to said plane; and positioning the wedges along said first optical axis of the interferometer so as to form an optical path for the interferometer, the wedges being tilted with respect to the first optical axis by approximately the same angle in opposite directions.

10. A method of manufacturing a Michelson interferometer according to claim 9, further comprising the step of providing the optical wedge plate with chamfers to serve as means of surface identification after the plate is divided.

* * * * *

UNITED STATES PATENT AND TRADEMARK OFFICE
CERTIFICATE OF CORRECTION

PATENT NO.   : 5,847,828
DATED        : December 8, 1998
INVENTOR(S)  : Downs

Page 1 of 1

It is certified that error appears in the above-identified patent and that said Letters Patent is hereby corrected as shown below:

Title page,
Item [63], after "abandoned" change "." to -- , -- and add:
-- which was the National Phase of International Application No. PCT/GB90/01394 filed September 7, 1990 --

Column 1,
Line 7, change the period to a comma and add:
-- and which was the National Phase of International Application No. PCT/GB90/01394, filed September 7, 1990. --

Signed and Sealed this

Twenty-fifth Day of December, 2001

Attest:

Attesting Officer

JAMES E. ROGAN
Director of the United States Patent and Trademark Office